Oct. 12, 1937.                J. Y. BLAZEK ET AL                2,095,225
                                MACHINING DEVICE
                          Filed Dec. 28, 1935        2 Sheets-Sheet 1

INVENTORS
John Y. Blazek
and
James F. Strnad
By C. F. Heinkel, ATTORNEY.

Oct. 12, 1937. J. Y. BLAZEK ET AL 2,095,225
MACHINING DEVICE
Filed Dec. 28, 1935 2 Sheets-Sheet 2

INVENTORS
John Y. Blazek
and
James F. Strnad
By C. F. Heinkel ATTORNEY.

Patented Oct. 12, 1937

2,095,225

UNITED STATES PATENT OFFICE 2,095,225

MACHINING DEVICE

John Y. Blazek, Maple Heights, and James F. Strnad, Bedford, Ohio, assignors to Lempco Products, Inc., Bedford, Ohio Application December 28, 1935, Serial No. 56,416

8 Claims. (Cl. 82—2)

The present invention relates to turning and trueing up of work pieces such as brake drums.

The objects of the present invention are: to provide a simple, inexpensive, easily operated device for turning work pieces such as drums or trueing up the same. To provide means on such a device whereby the work pieces can be installed and removed easily and quickly and either with or without other elements being connected to the work piece. To arrange parts of the device so that gravity thereof forms a useful function in the driving of the device. To provide such a device with a speed change mechanism which has a wide range of speed variations. To provide such a device with a rotation and feed reversing means. To provide such a device with means for receiving tools such as reamers, drills, and grinding wheels auxiliary to machining of work pieces but useful in connection therewith. To provide such a device with a bed which has a large floor contacting seat and a depression in the upper part thereof so that drums of small diameter can be machined by the device. To provide such a machine with means for receiving auxiliary tools for use thereof in connection with machining of work.

Other objects will be pointed out during the description of the device shown in the accompanying drawings, or will become apparent or obvious or will suggest themselves upon an inspection of the drawings and/or this specification.

The present invention aims, broadly speaking, to provide a simple and inexpensive machine, or a device attachable to a machine, onto which a drum or similar structure can be held and removed easily and conveniently, in which mechanism may or may not be attached to the drum or similar structure in which the elements are arranged so that small drums or similar structures can be turned by the device and in which the work to be turned, or mechanism thereon, overhangs one end of the machine so that the floor is the limit for the diameter of structures which can be handled by the machine.

In the prior art, such machines as lathes, have had blocks put thereon to raise the spindles for turning work of a larger diameter than the lathe could normally take; this was quite inconvenient and expensive in time required to make the change. So called gap lathes have also been made but these also are limited by the depth of the gap to diameters of work. In the present invention, the floor on which the machine stands is the limit for the size of work which the machine can take and, even then, a pit could be dug in the floor below the axis of the spindle of the machine for larger diameters of work. Such a pit will not interfere with the present machine since it is at one side of the bottom of the bed, will not interfere with other machines on the floor and will not offer a pit for anyone to step into since it is close to the bed of the machine where workmen usually do not walk.

The present invention is illustrated in the accompanying drawings, forming part of this specification, and in which:

Fig. 7 is a fragmental section showing the connection and disconnecting structure between the stepped pulley and one of the driving gears.

Similar reference characters refer to similar parts throughout the views.

Figure 1:
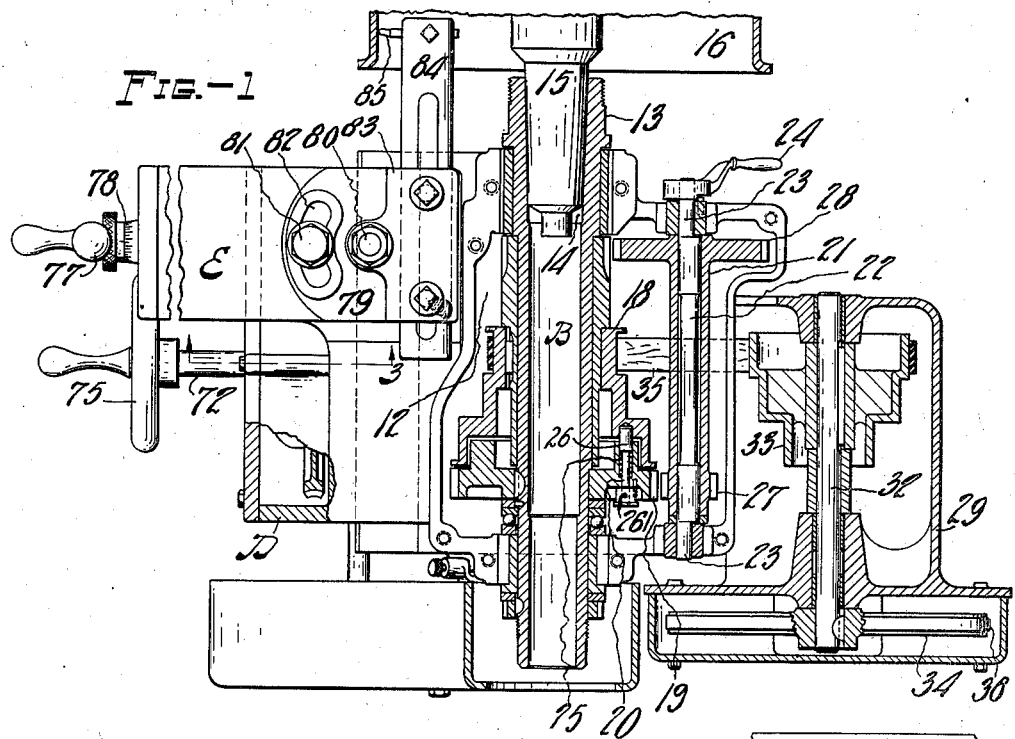
Fig. 1 is a plan view partly in horizontal section, the section being taken on the line 1—1 of Fig. 2, and illustrates the general arrangement and structure of a drum machining device designed according to the present invention.
Figure 2:
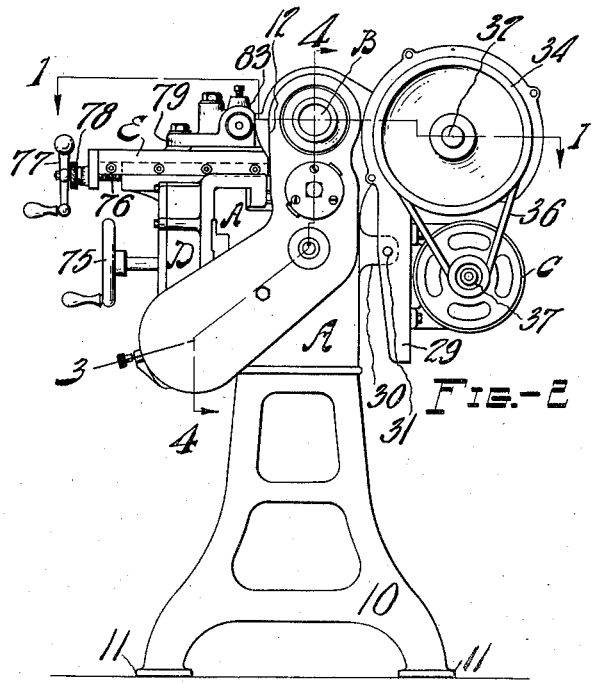
Fig. 2 is a rear end view of the device shown in Fig. 1 on a smaller scale showing more clearly the eccentric mounting of the motor.

Referring now specifically to the device shown in the drawings:

The bed A, of suitable material and design for strength required therein, has the convergent legs 10 on the bottom thereof and spread out laterally to provide a good footing for the bed and thereby mitigate or prevent as far as possible the production of vibrations in the machine when the same is in operation. The feet 11 spread laterally outwardly from the bottoms of the legs as a further aid in stabilizing the machine and in mitigating vibrations therein. In addition to the additional base surface attained by the feet, the same also serve as a means whereby the machine can be securely held to a floor or to a foundation.

The upper part of the machine may be integral with the bed or form a removable separate unit and has the side 12 thereof depressed for purposes appearing herein below.

In machines for machining brake drums for instance, while wheels or the like are attached thereto, the weight of the wheels and possible eccentricity thereof, together with an advantageous high rate of speed and the wheel overhanging a side of the machine causes vibrations in the machine which are adverse to production of good results in drum machining. The convergency of the legs and the feet thereon tend to materially mitigate vibration in the upper part of the bed at least and thereby promote smooth turning of a drum.

The spindle B is journaled in the upper part of the bed and held against endwise movement thereof. The end 13 of the spindle has the taper socket 14 therein, concentric with the axis of the spindle, to receive the end of the arbor 15 which fits to and supports the drum 16 and the wheel 17 mounted thereon. Arbors for different kinds of drum mountings may be substituted for the arbor shown or may be attached to the spindle in other manners. It is desirable, however, that such attached arbors each also has some means thereon which centralize the respective arbors relative to the axis of the spindle to prevent eccentric relation of the arbor and spindle when different arbors are used in the machine.

The stepped pulley 18 is journaled on the spindle B. The gear 19 is keyed onto the spindle and the below described pin 20 connects and disconnects the gear 19 and the pulley 18 so that the gear 19 rotates with or does not rotate with the pulley and rotates the spindle according to or corresponding with the speed of the pulley irrespective as to which one of steps of the pulley is driven.

It is noted that the step of the largest diameter of the pulley and the gear 19 are located rearwardly of the machine as an additional aid toward providing space at the front of the machine so that small diameter drums can be machined conveniently.

The sleeve 21 is journaled on the shaft 22 which latter has the eccentric ends 23 which are journaled in the upper part of the bed. The handle 24 is secured to one of the eccentric ends of the shaft 22 so that rotative movement of the shaft 22, by the handle 24, moves the axis of the shaft 22 about the axis of the eccentric parts thereof and thereby throws the back gears into and out of mesh with the gears on the stepped pulley. This structure provides a speed changing means additional to the speed changing attained by the steps of the pulley.

The above mentioned pin 20 is mounted to longitudinally slide in the gear 19 and is moved longitudinally in one direction by the spring 25 and is manually moved in the opposite direction.

The end 26 of the pin 20 fits slidingly into the gear 19 and into the pulley 18 and connects both when in the position shown in Fig. 1. When manually pulled back against the action of the spring 25 which longitudinally abuts the gear 19 and the end 26, the end 26 is released from the pulley 18 so that the latter can rotate independently of the gear 19. The gear 27 may be integral with or keyed onto one end of the sleeve 21. The gear 28 may be integral with or keyed on the other end of the sleeve 21 and both of these gears are adapted to be thrown into and out of mesh with the gears on the spindle due to the eccentrically journaled shaft 22.

The pin 20 (see Fig. 7) may have the eccentric head 201 thereon to recede into the counterbore 202 to connect the gear 19 and the pulley 18 and, when pulled out to disengage the gear and the pulley, may be turned half way around on the axis of the pin. The eccentric head will then abut the outer face of the hub on the gear 19 and keep the spring 25 from pulling it into the pulley 18.

The motor C, shown as an electric motor, is shown as being mounted on the swivel bracket 29 which is pivoted on the ear 30 extending from the bed by means of the pivot pin 31. The shaft 32 is journaled in the upper part of the bracket 29 and has the stepped pulley 33 keyed onto one end thereof and the pulley 34 keyed onto the other end thereof. The belt 35 is shiftable from one pair of steps of the pulleys 18 and 33 to another and establishes a driving connection therebetween. The belt 36 establishes a driving connection between the pulley 34 and the pulley 37 on the armature shaft of the motor.

The weight of the motor C and the bracket 29, due to the eccentric mounting thereof, normally tends to keep the belt 35 tight but permits of the bracket 29 being manually pivoted about the pin 31 when desired for such purposes of loosening the belt 35 for convenience in shifting the same from one pair of steps to another.

The gear 38 is mounted on the spindle and is held endwise thereon by the sleeve 39 which is threaded onto the spindle and has the socket 391 in the outer end thereof for reception of auxiliary tools such as reamers which may be or become useful in machining of drums or conditioning of tools or appliances for drum machining. The spindle and the sleeve 39 are hollow so that a bar can be extended therethrough to push arbors and the like out of the socket 14.

The sleeve 40 is mounted in the wall 41 of the bed and has the stub shaft 42 journaled therein.

The rotatable bracket 43 is journaled on one end of the sleeve 40 and has the eccentric flange 44 which carries the journaled gears 45 and 46. The handle 47 is on the bracket 43 for rotative movement thereof and extends to the outside of the device for easy and convenient rotatively moving of the bracket.

The gears 45 and 46 are in constant mesh with each other. The axis of the gear 45 being on one side of the axis of the sleeve 40 and the gear 46 being on the opposite side.

Figure 5:
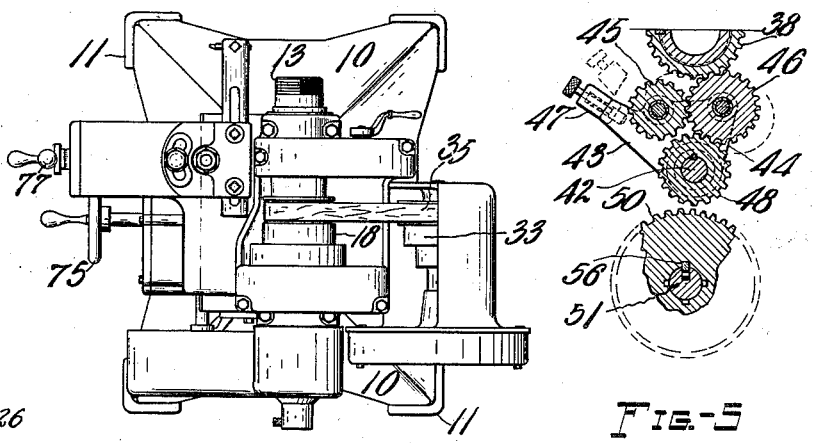
Fig. 5 is a vertical section taken on line 5—5 of Fig. 4 showing more clearly the quick-feed reversing mechanism.
Figure 6:
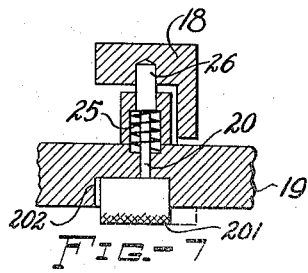
Fig. 6 is a more complete plan view of Fig. 1, on a smaller scale, showing more clearly the sturdiness of the device, the lateral spread of the feet thereof for mitigation of vibration in the device as a whole and also the depression in a side of the upper part of the device so that the machining means may be brought close to the axis of the spindle for machining drums of small diameter.

As seen in Fig. 5, the gear 46 is brought into mesh with the gear 38 and rotates the shaft 42 through the gear 48 in one rotative direction.

When the bracket 43 is pivoted so that the arm 47 is in the position shown in dotted lines, the gear 46 is thrown out of mesh with the gear 38 but the gear 45 is brought into mesh with the gear 38. In this latter bracket swivel, rotation is transmitted from the spindle to the shaft 42 through the three intermediaries 45, 46, and 48 to rotate the shaft 42 in one direction while in the former bracket swivel rotation is transmitted through the two intermediaries 46 and 48 and the shaft 42 is rotated reversely.

The gear 48 is keyed onto the stub shaft 42 and transmits rotary motion from the spindle to the gears 45 and 46.

The gear 49 is keyed onto the stub shaft 42 and meshes into the gear 50 which is mounted on the stub shaft 51. The gear 52 is keyed onto the stub shaft 42 and meshes into the gear 53 which is also mounted on the stub shaft 51. The stub shaft 51 is journaled in the wall 41 of the bed and has the feed change mechanism therein comprising the pull-out knob 54 slidable axially on the outer end of the shaft 51 and has one end of the driving key 55 pivoted thereto. The other end of the key 55 has the portion 56 adapted to engage in keyways in the gears 50 and 53. The spring 57 is mounted in a groove in the shaft 51 and normally tends to move the end 56 outwardly of the shaft 51 but allows the end 56 to be depressed when the knob 54 is being pulled outwardly. The bevel face 58 causes the end 56 to be depressed and come out of engagement with the gear 50 before it can enter into engagement with the gear 53 so that both of the gears 50 and 53 can never be in simultaneous engagement with the shaft 51. The diametrical ratios of the gears on the stub shafts affords a feed change mechanism and the mechanism on the stub shaft 42 affords a feed reversing mechanism.

The pulley 59 is secured to the shaft 51 and engages the belt 60 which also engages the pulley 61 mounted on the feed shaft 62; the latter being journaled in the bed and extends forwardly of the bed to the below described tool feeding means.

Figure 3:
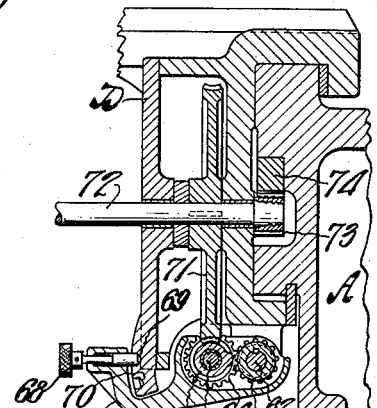
Fig. 3 is a section taken on line 3 of Fig. 2 showing more clearly the feed drive and the mechanism of quick throwing in and out thereof.
Figure 4:
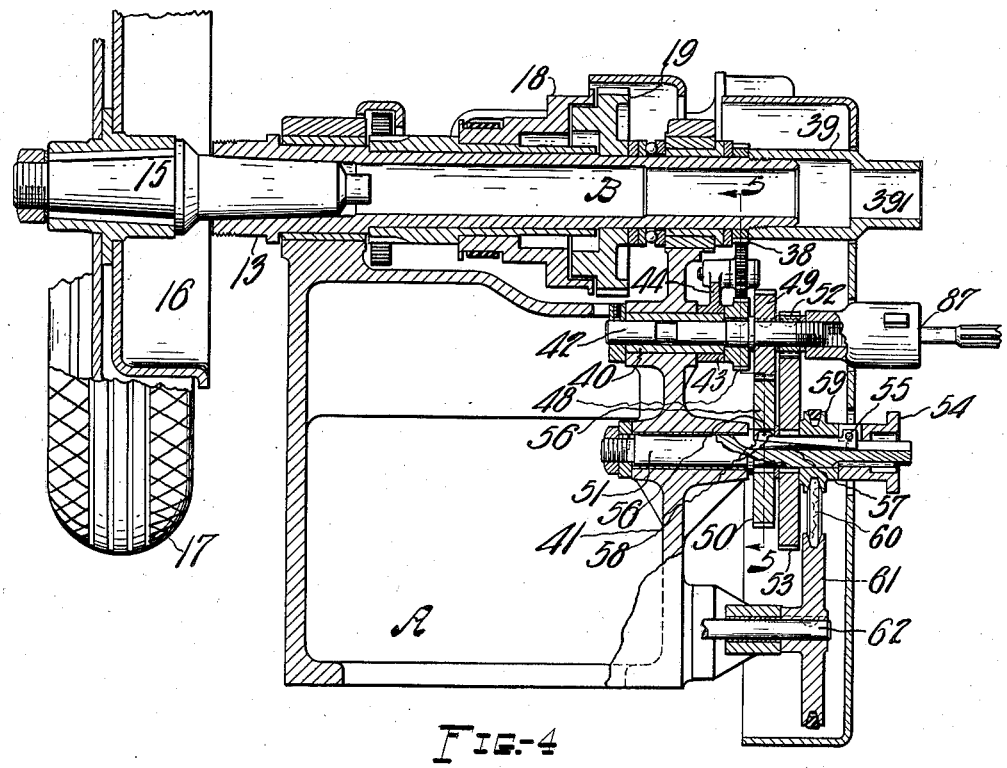
Fig. 4 is a vertical section of the device of Fig. 1 showing more clearly the feeding and feed changing mechanism as related to the spindle and the mechanisms to carry auxiliary tools.

The forward end of the feed shaft 62 has the gear 63 secured thereon which meshes into the gear 64 on the stub shaft 65. The worm 66 is driven by the gear 64. The arm 67 is pivoted into the shaft 62 and the shaft 65 is mounted therein. The arm projects out of the operators side of the device and has mounted therein the lock pin 68 which is spring pressed inwardly of the device to engage in either one of the holes 69 or 70 when the arm is pivoted accordingly. In the position shown in Fig. 3 the lock pin 68 engages the hole 69 and thereby holds the worm 66 in engagement with the worm wheel 71 which is mounted on the feed shaft 72. The pinion 73 meshes into the rack 74 mounted in the bed so that rotation of the shaft 72, either by the worm wheel 71 or the hand wheel 75 on the outer end of the shaft 72, moves the machining means relative to the bed. When the front end of the bracket is moved downwardly, and the stop pin enters the hole 70, the worm is out of mesh with the worm wheel and feeding stops.

The carriage D is mounted to slide along one side of the bed and is moved as described above.

The tool slide E is guided on the top of the carriage D, transversely to the travel thereof, has the screw 76 journaled therein and threaded into the carriage and also has the handwheel 77 secured to the outer end thereof to rotate the screw and thereby move the tool slide transversely of the carriage. The micrometer mechanism 78 between the screw and the tool slide afford an easy and convenient means for setting the below described tool accurately.

The plate 79 is pivotally mounted on the top of the slide E to swivel on the pivot pin 80. The lock screw 81 is threaded into the slide E to clamp the plate onto the slide when the same is pivotally adjusted. The slot 82 permits of swivelling of the plate 79.

The tool block 83 carries the boring tool holder 84 and the boring tool 85 is secured to the outer end thereof. The tool block 83 is swivelable on the pivot pin 80 and tightened down onto the plate 79 by the nut 86 threaded onto the pivot pin 80. This swivelability of the tool block and the plate permits the boring bar to be swiveled to various angles and very close to the side of the depressed part of the upper part of the bed for boring drums of very small diameter.

The outer end of the shaft 42 has a member with the socket 87 therein to receive tools or appliances useful in turning or boring or otherwise machining drums or other articles which the device shown can handle.

The operation of the device has been described hereinabove in regards to the various mechanisms thereof.

Generally, the operation of the device shown and described is as follows: The brake drum 16 on the wheel 17 is to be bored with the tire thereon. The arbor 15 suitable to the wheel 17, preferably, is first put into the spindle and the wheel is then mounted thereon. The carriage and boring means is then moved up to the drum 16 by means of the hand wheel 75. The boring bar 84 is then moved swivelably to bring the boring tool 85 into approximate position for boring and tightened down. The boring tool is then moved into correct boring position by means of the hand wheel 77. Upon starting the motor C, the belt drive rotates the spindle either directly or through the back gear and thereby rotates the arbor 15 and the wheel 17 thereon. The spread out legs and feet on the bed tends to mitigate in the device vibrations which might be caused by centrifugal force of the overhanging wheel 17 or by the driving means of the device. The carriage and the tool slide are then moved to bring the boring tool into proper drum machining position by means of the hand wheels 75 and 77 and the micrometer mechanism 78 is used to bring the boring tool to an accurate setting. The handle 47 is then moved to bring the proper gearing into mesh to feed the carriage and the tool thereon inwardly of the drum. The handle 68 is then moved upwardly to bring the worm 66 into mesh with the worm wheel 71 to thereby rotate the shaft 72 for feeding the carriage and the tool through the rack and pinion 73. When the tool has machined the drum to desired depth, the handle 65 may be moved downwardly whereby the feeding will be stopped whereupon the tool may be withdrawn by means of the handwheel 75 or the handle 68 may be left in place and the handle 47 be shifted to bring the other train of feed gears into operation and thereby reverse the feeding mechanism and feed the tool outwardly of the drum for a second cut. The micrometer mechanism 78 may be used to determine the depth of this second cut.

Change of feed is effected by knob 54 longitudinally to bring the key 56 into engagement with the gears.

Having described the present invention generally, and specifically as applied to the drum machining device illustrated, and being aware that structural and functional changes and changes in arrangement of elements can be made in the structure shown and described within the spirit and intent of the present invention and the appended claims, we claim:

1. In a drum machining device, a bed having a head thereon, a drum carrying and drum rotating spindle journaled in said bed, a stepped pulley on said spindle to vary the speed thereof, a releasable and insertable back gear between said stepped pulley and said spindle to vary the speed of said spindle in addition to the speed variations attainable with said stepped pulley, a belt drive adapted to be changed from one of the steps on said pulley to another, a motor to drive said pulley, said motor being movable and arranged so that the weight thereof normally retains said belt under proper tension, and a drum machining tool means on said bed.

2. In a drum machining device, a bed having a head thereon, a drum carrying and drum rotating spindle journaled in said head, a driving means for said spindle, including a motor pivoted onto said bed so that the weight of said motor retains proper driving relation thereof with said spindle, spindle speed change means on said spindle, additional spindle speed change means on the device, co-operating with the first mentioned spindle speed change means, a drum machining tool means mounted on said bed, and means for feeding said tool means relative to a drum being machined.

3. In a drum machining device, a bed, legs convergent on said bed and feet on the bottoms of said legs and extending outwardly therefrom to mitigate vibrations of the device and promote smooth machining thereby, a drum carrying and drum rotating spindle journaled in said bed, a driving motor for said spindle pivoted onto said bed, the axis of the pivot of said motor being eccentric with the axis of said motor, a movable carriage slidably mounted on said bed, a drum machining tool carried by said carriage, means driven by said motor to move said carriage for feeding of said tool thereon, a reversing means for the feed of said carriage, and a handle extending beyond the outside of said bed and being movable to operate said reversing means.

4. In a drum machining device, a bed, a drum carrying spindle journaled in said bed, a speed change means for said spindle comprising a belt driven stepped pulley on said spindle, a back gear related to said pulley and to said spindle to be engaged therewith and disengaged therefrom, speed change mechanism in said bed, a speed changing control handle extending to the outside of said bed, and a motor to drive said spindle and said speed change means.

5. In a drum machining device, a bed having a portion of the upper part thereof depressed to adapt the device for machining drums of small diameters, a drum carrying spindle journaled in the upper part of said bed, a drum machining means mounted to adjustably move transversely of said bed and of the drum on said spindle, and a drum machining tool adjustably mounted on said drum machining means to adjust the tool angularly relative to the line of adjustment of said drum machining means.

6. In a drum machining device, a bed having the lower part thereof extended laterally to mitigate vibrations in the device and having one side of the upper part thereof depressed to permit of small diameter drums to be machined by the device, a work carrying spindle journaled in the upper part of said bed, an arbor easily attachable to and easily removable from one end of said spindle and overhanging a side of the device, means on rotating parts of the device for receiving the driving means of auxiliary tools, the machining ends of the auxiliary tools extending outwardly of the device when so inserted, a rotating means for said spindle and said rotating parts co-operating therewith, and a part of said spindle rotating means mounted so that the gravity thereof keeps a normal tension on said spindle rotating means.

7. A device for machining the inside or the outside of brake drums while the same are attached to a wheel having a bed and brake drum carrying and brake drum rotating means and brake drum machining means and a feeding means for the machining means including a pivotally mounted bracket, motion transmitting and motion reversing members thereon and in co-operative relation with other members of the feeding means, and a handle on a side thereof to swivel the same and thereby throw said motion transmitting members into the feeding means when said handle is moved in one direction and throw said motion reversing members into the feeding means when said handle is moved in the opposite direction.

8. A machining device having a bed and work carrying and work rotating means and work machining means and a feeding means for the machining means including a pivotally mounted bracket, motion transmitting and motion reversing members thereon and in co-operative relation with other members of the feeding means, a handle on a side thereof to swivel the same and thereby throw said motion transmitting members into the feeding means when said handle is moved in one direction and throw said motion reversing members into the feeding means when said handle is moved in the opposite direction, and an easy and quick cutout of said feeding means including a pivotally mounted arm carrying a connecting member engageable with and disengageable from a member of said feeding means and a handle on the outer end of said arm, lockable to a fixed part of the device and moving said connecting member into engagement with a member of said feeding means when moved in one direction and moving said connecting member out of engagement with the member of said feeding means when moved in the opposite direction.

JOHN Y. BLAZEK.
JAMES F. STRNAD.